United States Patent [19]
Thomas et al.

[11] Patent Number: 5,765,497
[45] Date of Patent: Jun. 16, 1998

[54] BOW VANE WITH INTEGRAL SUSPENSION FAIRINGS

[75] Inventors: Mark Anthony Thomas; George Oliver Haskin, both of San Jose, Calif.

[73] Assignee: United Defense LP, Arlington, Va.

[21] Appl. No.: 741,800

[22] Filed: Oct. 31, 1996

[51] Int. Cl.$^6$ .................................................. B63B 35/00
[52] U.S. Cl. .......................................................... 114/270
[58] Field of Search ................................. 114/343, 344, 114/271, 274, 275, 276, 277, 270

[56] References Cited

U.S. PATENT DOCUMENTS

| | | | |
|---|---|---|---|
| 3,420,204 | 1/1969 | Samuel | 115/1 |
| 3,809,005 | 5/1974 | Rodler, Jr. | 115/12 R |
| 3,983,832 | 10/1976 | Kinder | 115/1 R |
| 4,073,257 | 2/1978 | Rodler, Jr. | 115/12 R |
| 4,953,492 | 9/1990 | Duffty | 114/282 |
| 5,027,737 | 7/1991 | Duffty et al. | 114/270 |

OTHER PUBLICATIONS

Brochure: "KaMeWa Marine Laboratory" (8 pages) General disclosure of the KaMeWa Marine Laboratory.
Flyer: "KaMeWa FF-Jet 450, Water-Jet Propulsion for Maritime Professionals" (2 pages) Specifications and photographs.
Brochure: "Water jets by KaMeWa, The Ultimate in Propulsion"(16 pages) General dislcosure of the KaMeWa Water jets.

*Primary Examiner*—Stephen Avila
*Attorney, Agent, or Firm*—Michael B.K. Lee; Douglas W. Rudy

[57] ABSTRACT

The invention provides an amphibious vehicle that integrates suspension fairing with a movable bow vane. This integration, allows the suspension fairings to be stored between the bow vane and the hull of the vehicle during land use and to be automatically deployed during water use. The suspension fairing uses a deployment system connected with the bow vane deployment system, so that they are deployed and retracted as an integral system.

18 Claims, 5 Drawing Sheets

BOW VANE WITH INTEGRAL SUSPENSION FAIRINGS

BACKGROUND OF THE INVENTION

The present invention relates to amphibious vehicles. An example of an amphibious vehicle is described in U.S. Pat. No. 4,953,492.

Some amphibious vehicles use bow vanes to reduce the resistance of the vehicle, and in addition use "suspension fairings" to overcome the resistance of suspension components, such as wheels or tracks of the vehicle. Such bow vanes and suspension fairings enhance the performance of the vehicle in water by keeping the bow of the craft from submerging as water speed is increased and by presenting a lower total resistance of the submerged part of the vehicle. In some instances bow vanes and suspension fairings enable an amphibious vehicle to achieve a water speed sufficient to make the amphibious vehicle a planing craft rather than a displacement craft. A planing craft will typically achieve as much as twice the speed of a similar displacement craft.

SUMMARY OF THE INVENTION

It is an object of the invention to provide an amphibious vehicle with an easily deployable bow vane and suspension fairing system.

It is another object of the invention to provide an amphibious vehicle which reduces the exposure of the suspension fairing system to land obstacles.

The invention provides an amphibious vehicle with an integrated bow vane and fairings storage and deployment system. The invention mounts that fairings on the interior of the bow vane, so that the fairings are extended as the bow vane is deployed.

DESCRIPTION OF THE PREFERRED EMBODIMENTS

Figure 1:
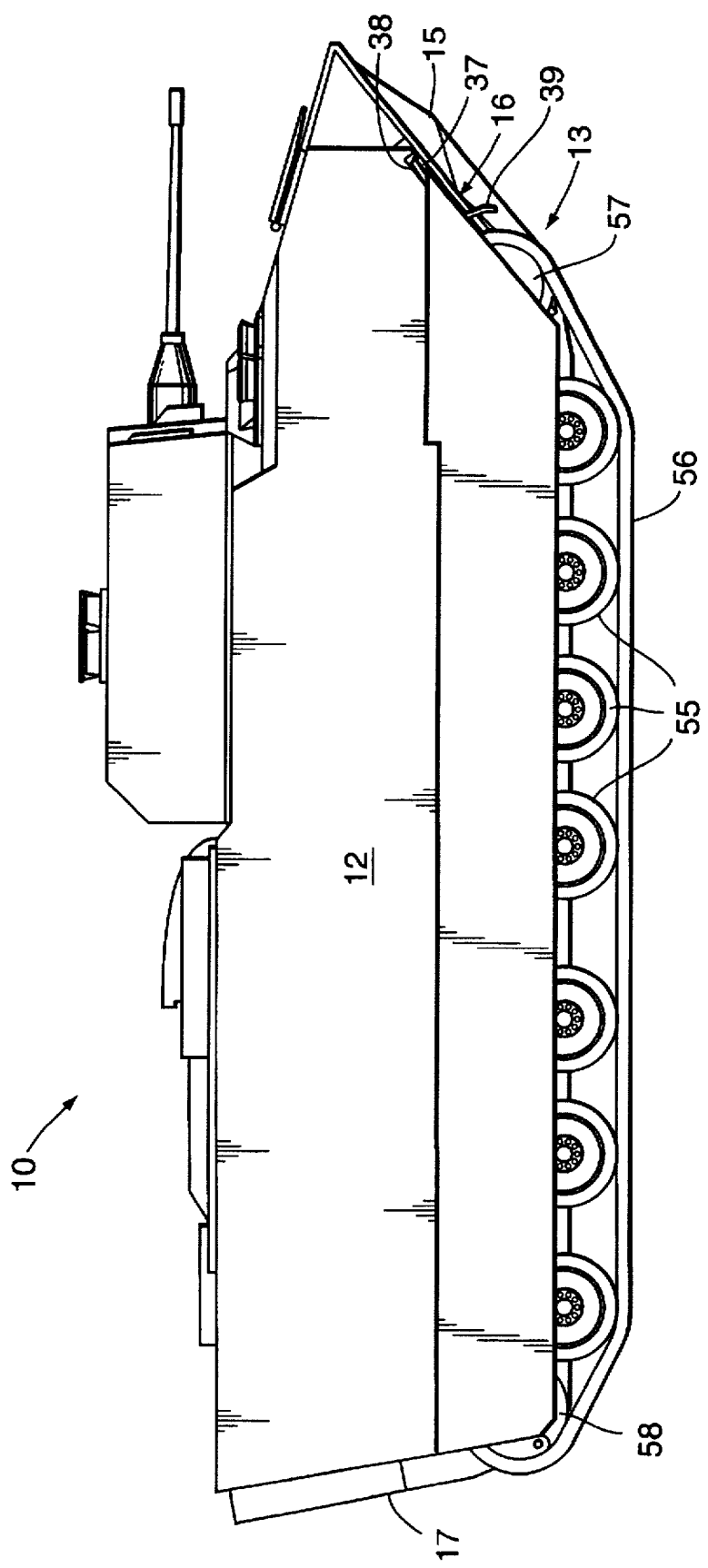
FIG. 1 is a side view of an amphibious vehicle using a preferred embodiment of the invention in a land travel configuration.
Figure 2:
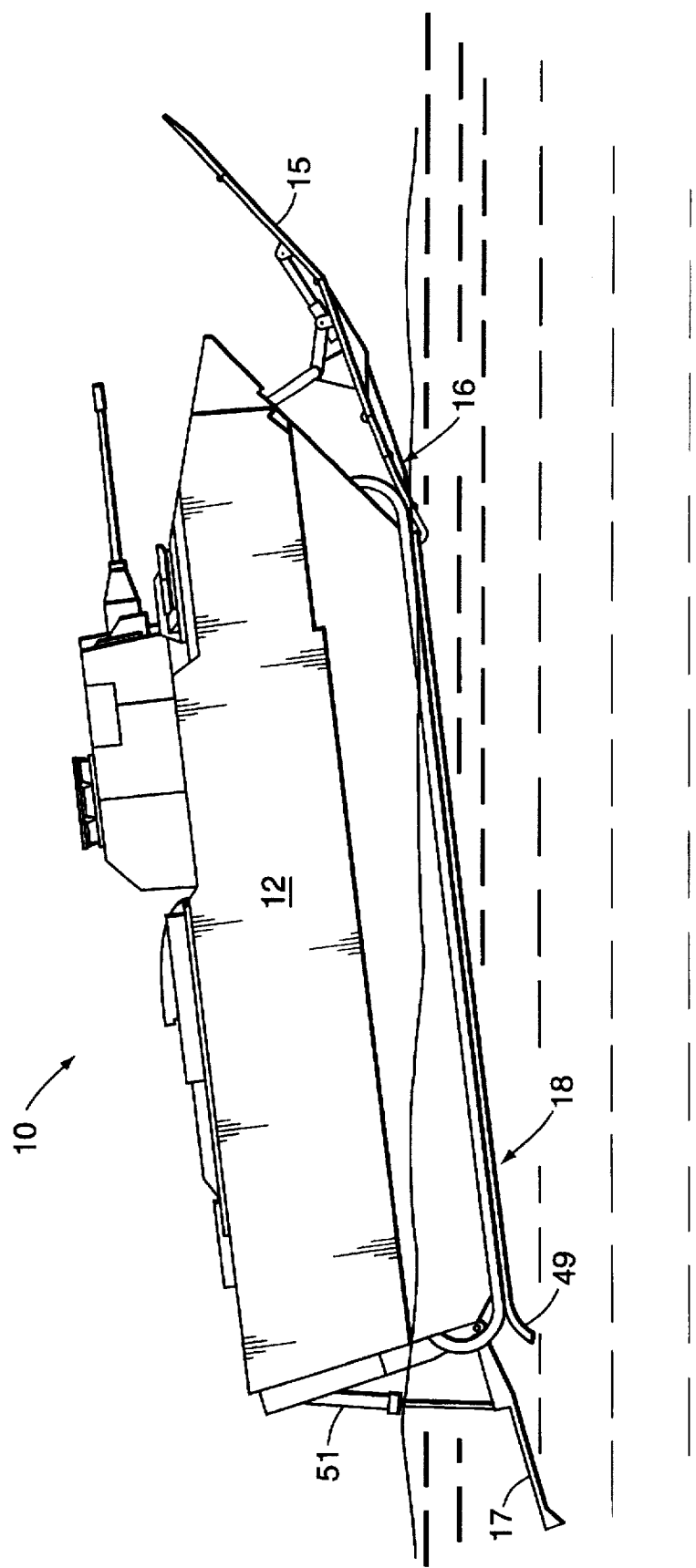
FIG. 2 is a side view of the amphibious vehicle shown in FIG. 1 in a high speed water travel configuration.

FIG. 1 is a side view of an amphibious vehicle 10 using a preferred embodiment of the invention in a land travel configuration. The vehicle includes a hull 12, a suspension system 13, which in this embodiment are tracks and wheels, for propelling and steering the amphibious vehicle 10 on land. FIG. 2 is a side view of the amphibious vehicle 10 in a high speed water travel configuration. Mounted to the hull 12 for use in water are a bow vane 15, suspension fairings 16, a transom flap 17 and chine covers 18.

Figure 3:
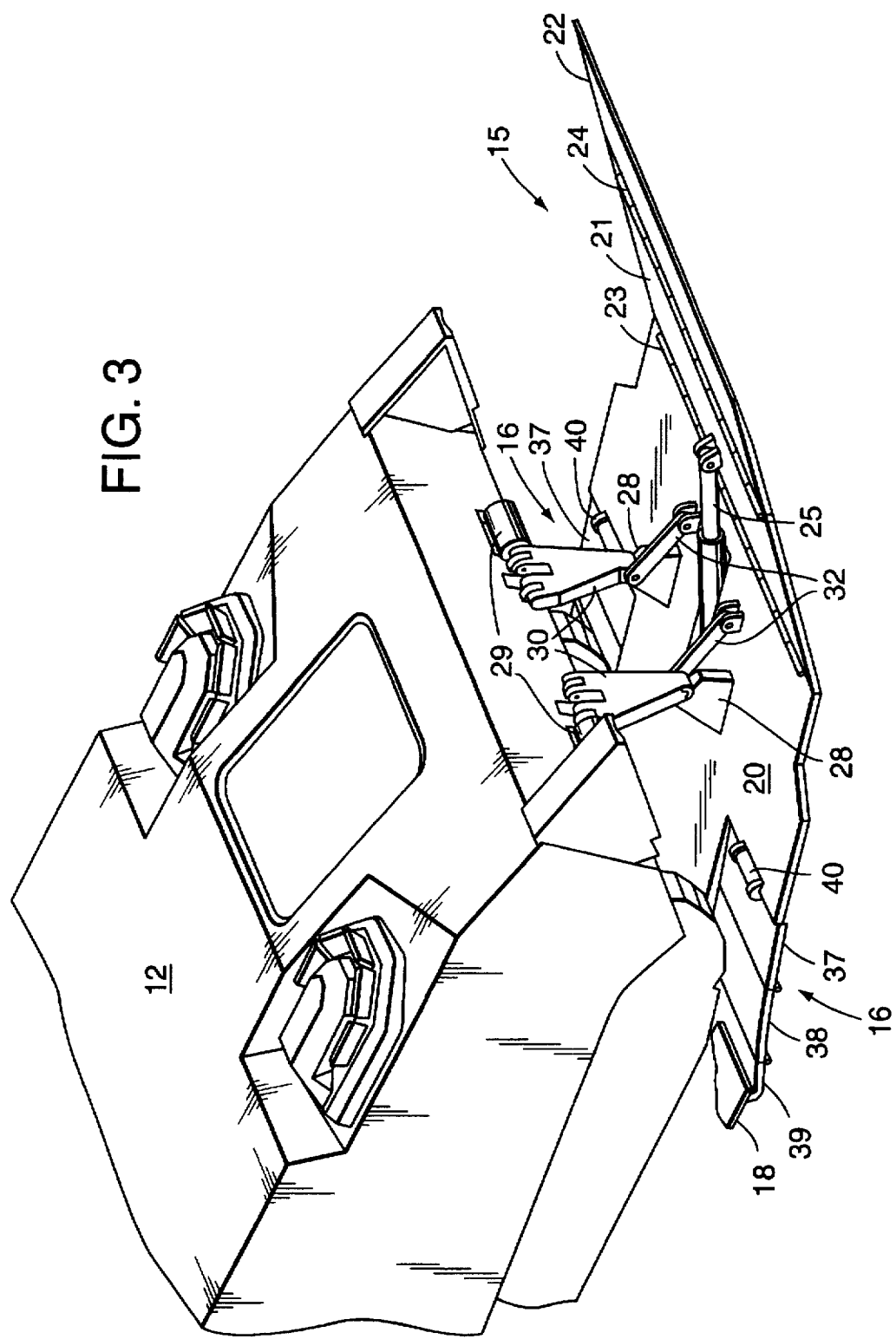
FIG. 3 is a perspective view of the front of the amphibious vehicle shown in FIG. 2.

FIG. 3 is a perspective view of the front of the amphibious vehicle 10 shown in FIG. 2. The bow vane 15 is comprises a main plate 20, a middle plate 21, and an end plate 22. The main plate 20 is mechanically connected to the middle plate 21 by a bow vane hinge 23. The middle plate 21 is mechanically connected to the end plate 22 by a bow vane rotary actuator 24. A hydraulic cylinder 25 is mechanically connected between the main plate 20 and the middle plate 21. A pair of mounting arms 28 are mechanically connected to the main plate 20. A pair of rotary motors 29 are mounted to the hull 12. A pair of pivot arms 30 are keyed to motor shafts driven by the rotary motors 29. The motors shafts are keyed to a first end of the pivot arms 30. The mounting arms 28 are connected to a second end of the pivot arms 30 by hinges, which are also connected to first ends of stabilizing arms 32. Second ends of the stabilizing arms 32 are mechanically connected to the main plate 20 by hinges. In this embodiment a pair of suspension fairings 16 is provided with one suspension fairing on the right side of the bow vane 15 and another suspension fairing on the left side of the bow vane 15.

Figure 4:
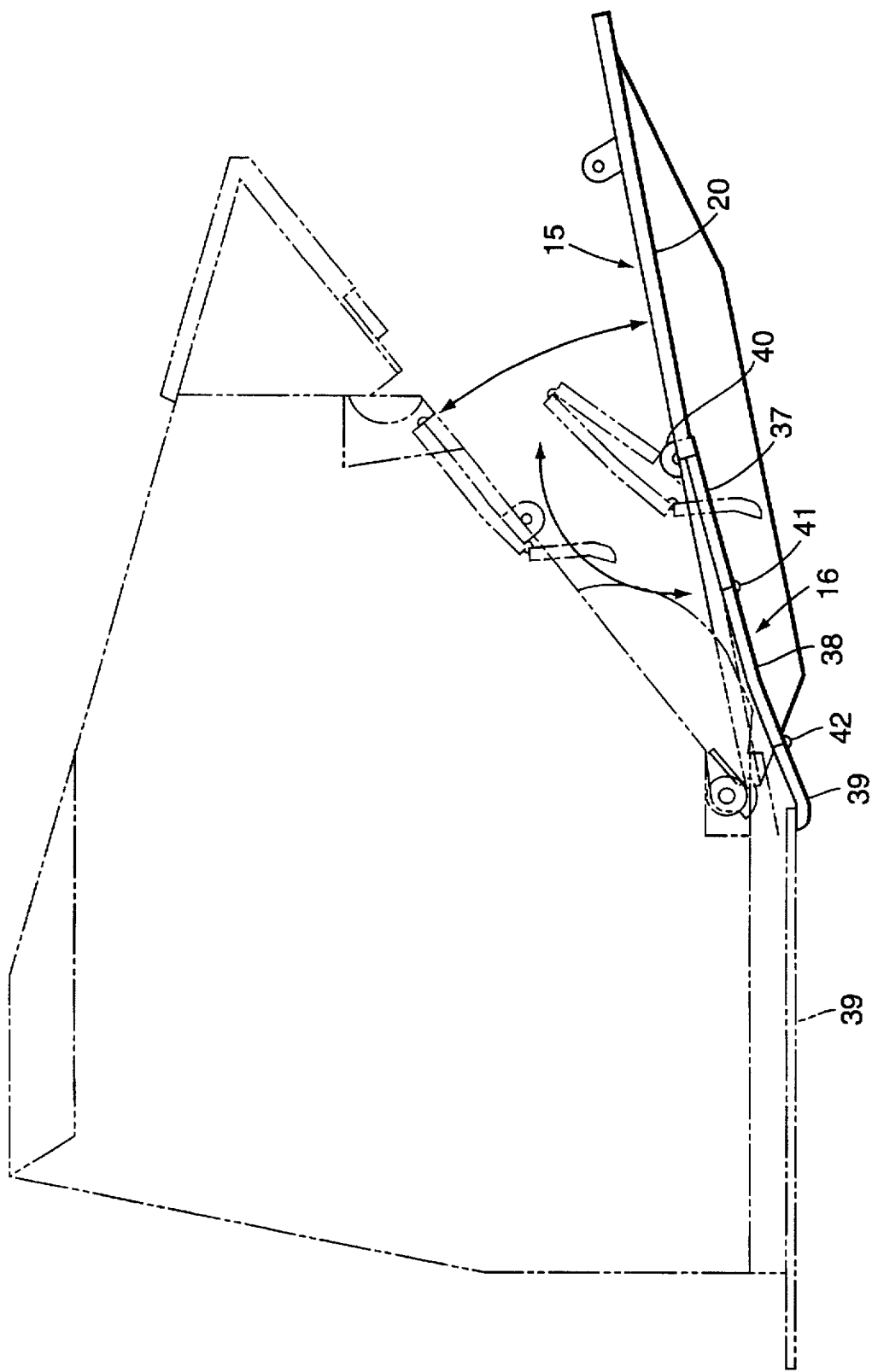
FIG. 4 is detailed view of the deployment of the suspension fairings.

FIG. 4 is detailed view of the deployment of the suspension fairings 16. Each suspension fairing 16, comprises a connection plate 37, a fairing middle plate 38, and a fairing end plate 39. A fairing rotary actuator 40 mechanically connects the connection plate 37 to the main plate 20 of the bow vane 15. A first faring hinge 41 mechanically connects the connection plate 37 to the fairing middle plate 38 of the suspension fairing 16. A second fairing hinge 42 mechanically connects the fairing middle plate 38 to the fairing end plate 39.

Figure 5:
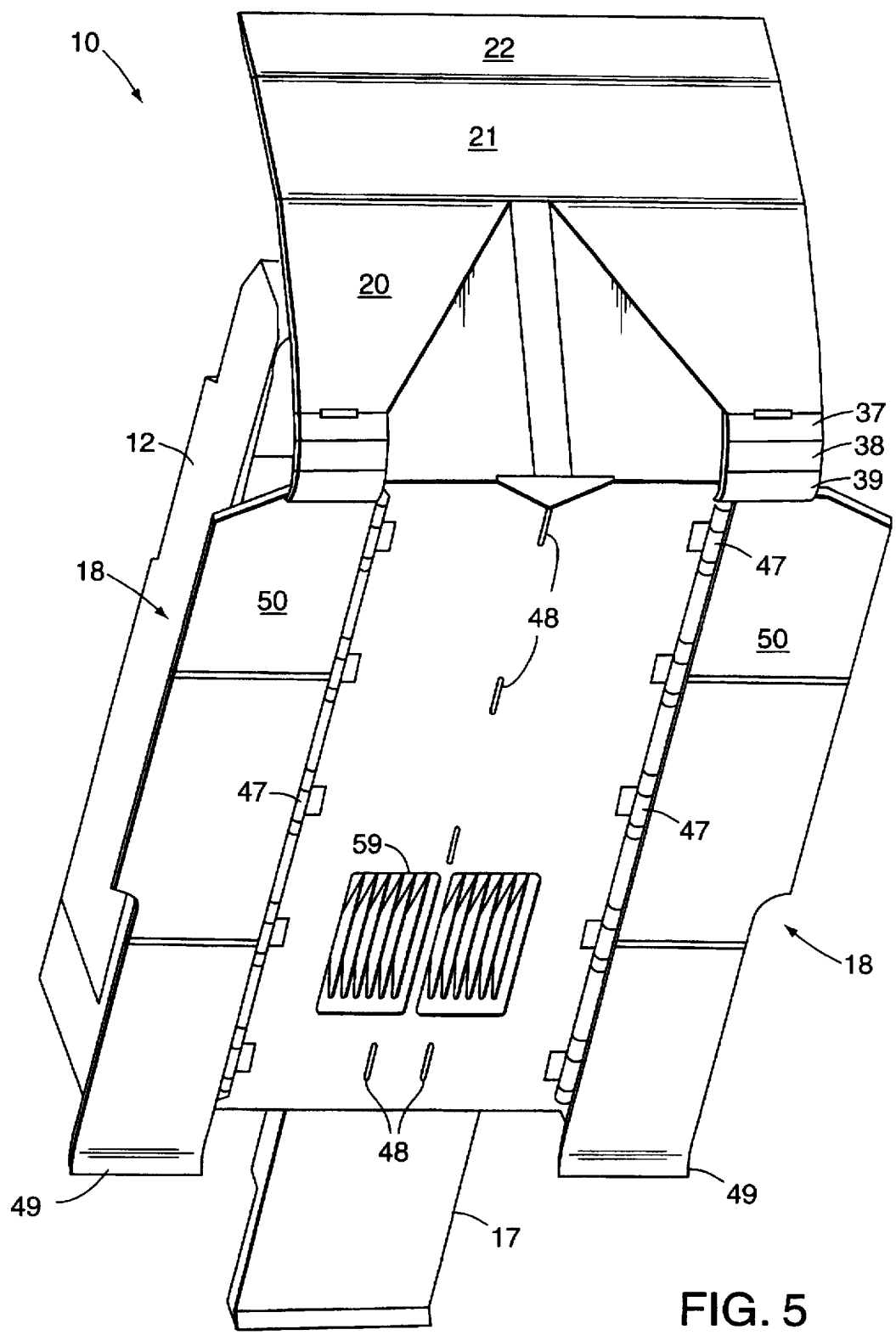
FIG. 5 is a bottom perspective view of the amphibious vehicle shown in FIG. 2.

FIG. 5 is a bottom perspective view of the amphibious vehicle 10 in a high speed water travel configuration. The chine covers 18 are mounted to the hull 12 by chine cover rotary actuators 47. T-shaped arms 48 are mounted at the bottom of the hull 12 to support the chine covers 18 when the amphibious vehicle 10 travels on land. Each chine cover 18 comprises a trim tabs 49, which are formed from a curved end of the chine cover furthest from the bow vane 15, and a flat plate 50.

The transom flap 17, FIG. 2, is mechanically connected to the hull 12 by a hinge. A transom hydraulic cylinder 51 is connected between the transom flap 17 and the hull 12 of the amphibious vehicle 10.

Water jet intake manifolds 59 are placed at the bottom of the hull 12. A means for propelling in water the amphibious vehicle 10 up to a speed greater than 15 miles per hour, comprises the water jet intake manifolds 59, water jets, and water jet outlets located adjacent to the transom flap 17. The water jets take water into the water jet intake manifolds 59 and the propel the water out of the jet outlets at a high speed. A more detailed description of the transom flap 17 and the means for propelling in water are described in U.S. patent application Ser. No. 08/595,943 filed Feb. 6, 1996 incorporated by reference.

Road wheels 55, tracks 56, drive sprockets 57, and idler sprockets 58 form the suspension system 13 in this embodiment.

In operation, the amphibious vehicle may start in land travel mode as shown in FIG. 1. The bow vane 15 is against the hull 12. The connection plate 37 and the fairing middle plate 38 are folded between the bow vane 15 and the hull 12. Part of the fairing end plate 39 extends down from the bow vane 15 and acts as a mud flap and a water diverter. The chine covers 18 are folded under the hull 12 and held in place by the T-shaped arms 48. The transom flap hydraulic cylinder 51 is collapsed to hold the transom flap 17 in the up position. The road wheels 55 and tracks 56 are extended down. In this mode, the amphibious vehicle 10 may travel over land or aboard a boat.

In the land mode, the amphibious vehicle 10 would drive into water and will be able to float. The suspension system 12 may be driven, to provide limited propulsion to the amphibious vehicle 10 in water. As the track 56 rotates, it pushes water backwards at the bottom of the track 56 and water forwards at the top of the track 56. The water propelled forward, is diverted downward by the fairing end plates 39 pushing the front of the amphibious vehicle 10 upward, increasing the propulsion efficiency of the tracks 56. The transom flap 17 is lowered to expose the water jet outlets. In the closed position, the chine covers 18 cover only part of the water jet intake manifolds 59. This allows the means for water propulsion to also provide some propulsion to the amphibious vehicle 10.

When the amphibious vehicle 10 is in sufficiently deep water, it is able to transform to a high speed water travel configuration. The rotary motors 29 pivot the pivot arms 30, moving the bow vane 15 forward and away from the hull 12. The hydraulic cylinder 25 extends increasing the angle between the main plate 20 and the middle plate 21. The bow vane rotary actuator 24 rotates the end plate 22 of the bow vane 15 so that the end plate 22 becomes co-planar with the middle plate 21 of the bow vane 15. After the rotary motors 29 move the bow vane 15 away from the hull 12, the fairing rotary actuator 40 rotates the connection plate 37 until the connection plate 37 becomes co-planar with the main plate 20, as shown in FIG. 4. The first fairing hinge allows the fairing middle plate 38 to freely rotate a maximum of approximately 180° with respect to the connection plate 37. At first gravity will probably pull the fairing middle plate 38 downwards. The second fairing hinge 42 allows the fairing end plate 39 to freely rotate a maximum of approximately 180° with respect to the fairing middle plate 38. At first gravity will probably pull the fairing end plate 39 downwards. The road wheels 55 and the tracks 56 are raised about 9 inches towards the hull 12. The T-shaped arms 48 are rotated to release the chine covers 18. The chine cover rotary actuators 47 rotate the chine covers 18 from the land travel mode position under the hull 12 to the high speed water travel configuration as shown in FIG. 5.

The means for propelling in water the amphibious vehicle 10 begins to propel the amphibious vehicle 10 through the water at speeds greater than 15 miles an hour. The chine covers 18 reduce the resistance due to the tracks 56. As the speed of the amphibious vehicle 10 increases, the water pushes the fairing middle plate 38 and the fairing end plate 39 towards the back of the amphibious vehicle 10 and against the part of the track adjacent to the drive sprocket 57, and so that the fairing end plate 39 touches the chine cover 18, as shown in FIGS. 2–4. At speeds greater than 15 miles per hour, the amphibious vehicle 10 passes through water as a planing craft as shown in FIG. 2. At these speeds the downward curvature of the trim tabs 49 enhances the lift of the amphibious vehicle 10 in water.

As the amphibious vehicle 10 approaches a landing location, while the water is deep enough, the amphibious vehicle 10 slows down. The chine cover rotary actuators 47 rotate the chine covers 18 from high speed water travel configuration, as shown in FIG. 5, to the land travel mode position under the hull 12. The trip tabs 49 fit snugly against the hull 12, which is shaped to accommodate the shape of the trim tabs 49. The T-shaped arms 48 are rotated to secure the chine covers 18 under the hull 12. The road wheels 55 and the tracks 56 are lowered from the hull 12. The fairing rotary actuator 40 rotates the connection plate 37 until the connection plate 37 is against the main plate 20 between the main plate and the hull 12. This causes the first faring hinge 41 to create a bend between the connection plate 37 and the fairing middle plate 38, causing the fairing middle plate 38 to lie flat against the connection plate 37 between the connection plate 37 and the hull 12, as shown in FIG. 1. Gravity causes the fairing end plate 39 to extend downward. The rotary motors 29 pivot the pivot arms 30, moving the bow vane 15 against the hull 12. The hydraulic cylinder 25 contracts, decreasing the angle between the main plate 20 and middle plate 21, pulling the middle plate 21 to the hull 12. The bow vane rotary actuator 24 rotates the end plate 22 of the bow vane 15 so that the end plate 22 moves to a position against the hull 12, as shown in FIG. 1. The tracks 56 and the means for propelling in water are used to move the amphibious vehicle 10 to land. The transom flap hydraulic cylinder 51 is then collapsed lifting the transom flap 17. The amphibious vehicle 10 is then able to move on land.

The suspension fairings 16 do not require manual deployment, and may be automatically deployable and retractable with the bow vane 15. During land travel, the suspension fairings 16 are protected and out of the way and the fairing end plate 39 serves as a mud flap. The suspension fairing 16 uses a deployment system connected with the bow vane 15 deployment system, so that they are deployed and retracted as an integral system.

In the preferred embodiment, the bow vane rotary actuator 24, hydraulic cylinder 25, rotary motors 29, fairing rotary actuator 40, chine cover rotary actuators 47, T-shaped arms 48, and transom flap hydraulic cylinder 51 are all hydraulically driven. In other embodiments, these may be electrically driven. The suspension system in other embodiments may use only wheels, instead of a track and wheel system.

While preferred embodiments of the present invention have been shown and described herein, it will be appreciated that various changes and modifications may be made therein without departing from the spirit of the invention as defined by the scope of the appended claims.

What is claimed is:

1. An amphibious vehicle, comprising:

a hull;

a suspension system supporting the hull;

a bow vane;

means for moving the bow vane towards and away from the hull, mechanically connected between the bow vane and the hull;

a first suspension fairing, comprising:
  a first plate;
  a first hinge mechanically connected the first plate; and
  a second plate mechanically connected to the first hinge;

a first rotary actuator mechanically connected between the first plate of the first suspension fairing and the bow vane;

a second suspension fairing, comprising:
  a first plate;
  a first hinge mechanically connected the first plate; and
  a second plate mechanically connected to the first hinge; and a second rotary actuator mechanically connected between the first plate of the second suspension fairing and the bow vane.

2. The amphibious vehicle, as claimed in claim 1, wherein the first suspension fairing, further comprises:

a second hinge mechanically connected to the second plate; and a third plate mechanically connected to the second hinge; and wherein the second suspension fairing, further comprises:

a second hinge mechanically connected to the second plate; and a third plate mechanically connected to the second hinge.

3. The amphibious vehicle, as claimed in claim 2, wherein the bow vane, comprises:

a main plate mechanically connected to the means for moving the bow vane, and mechanically connected to the first rotary actuator and the second rotary actuator;

a middle plate;

means for rotating the middle plate with respect to the main plate, mechanically connected to the middle plate.

4. The amphibious vehicle, as claimed in claim 3, wherein the bow vane, further comprises:

an end plate; and means rotating the end plate with respect to the middle plate, mechanically connected between the end plate and middle plate.

5. The amphibious vehicle, as claimed in claim 4, further comprising:

a first chine cover located under the hull;

a means for moving the first chine cover from a land traveling position to a water traveling position, wherein the first suspension fairing extends from the bow vane to the first chine cover, when the first chine cover is in the water traveling position;

a second chine cover located under the hull; and a means for moving the second chine cover from a land traveling position to a water traveling position, wherein the second suspension fairing extends from the bow vane to the second chine cover, when the second chine cover is in the water traveling position.

6. The amphibious vehicle, as claimed in claim 5, wherein the first chine cover, comprises:

a trim tab on an end of the first chine cover away from the bow vane; and a flat plate mechanically connected to the trim tab and the means for moving the first chine cover, and extending from the trim tab to the first suspension fairing; and wherein the second chine cover, comprises:

a trim tab on an end of the second chine cover away from the bow vane; and a flat plate mechanically connected to the trim tab and the means for moving the second chine cover, and extending from the trim tab to the second suspension fairing.

7. The amphibious vehicle, as claimed in claim 6, further comprising, means for propelling in water the amphibious vehicle to speed greater than 15 miles per hour, wherein said means is mechanically connected to the hull.

8. The amphibious vehicle, as claimed in claim 7, further comprising:

a transom flap rotatably connected to the hull; and means for raising and lowering the transom flap.

9. The amphibious vehicle, as claimed in claim 2, further comprising:

a first chine cover located under the hull;

a means for moving the first chine cover from a land traveling position to a water traveling position, wherein the first suspension fairing extends from the bow vane to the first chine cover, when the first chine cover is in the water traveling position;

a second chine cover located under the hull; and a means for moving the second chine cover from a land traveling position to a water traveling position, wherein the second suspension fairing extends from the bow vane to the second chine cover, when the second chine cover is in the water traveling position.

10. The amphibious vehicle, as claimed in claim 9, wherein the first chine cover, comprises:

a trim tab on an end of the first chine cover away from the bow vane; and a flat plate mechanically connected to the trim tab and the means for moving the first chine cover, and extending from the trim tab to the first suspension fairing; and wherein the second chine cover, comprises:

a trim tab on an end of the second chine cover away from the bow vane; and a flat plate mechanically connected to the trim tab and the means for moving the second chine cover, and extending from the trim tab to the second suspension fairing.

11. The amphibious vehicle, as claimed in claim 10, further comprising, means for propelling in water the amphibious vehicle to speed greater than 15 miles per hour, wherein said means is mechanically connected to the hull.

12. The amphibious vehicle, as claimed in claim 11, further comprising:

a transom flap rotatably connected to the hull; and means for raising and lowering the transom flap.

13. The amphibious vehicle, as claimed in claim 12, further comprising, means for raising and lowering the suspension system.

14. The amphibious vehicle, as claimed in claim 13, wherein the suspension system comprises:

a right track on the right side of the hull;

a right drive sprocket within the right track;

a right idler sprocket within the right track;

a plurality of right road wheels within the right track;

a left track on the left side of the hull;

a left drive sprocket within the left track;

a left idler sprocket within the left track; and a plurality of left road wheels within the left track.

15. The amphibious vehicle, as claimed in claim 1, wherein the rotary actuator is postioned to rotate the first plate of the first suspension fairing to a position between the bow vane and the hull, and wherein the second rotary actuator is positioned to rotate the first plate of the second suspension fairing to a postion between the bow vane and the hull.

16. A method for converting an amphibious vehicle, comprising the steps of:

moving a bow vane forward from a hull of the amphibious vehicle;

rotating a first suspension fairing from a position between the bow vane and the hull to a position behind where the first suspension fairing is mechanically connected to the bow vane; and rotating a second suspension fairing from a position between the bow vane and the hull to a position behind where the second suspension fairing is mechanically connected to the bow vane.

17. The method for converting, as recited in claim 16, further comprising the steps of:

raising a suspension system;

moving a first chine cover from under the hull to a position under part of the suspension system; and moving a second chine cover from under the hull to a position under part of the suspension system.

18. The method for converting, as recited in claim 17, further comprising the steps of:

rotating the first suspension fairing from a position behind where the first suspension fairing is mechanically connected to the bow vane to a position between the bow vane and the hull;

rotating the second suspension fairing from a position behind where the second suspension fairing is mechanically connected to the bow vane to a position between the bow vane and the hull; and moving the bow vane back to the hull of the amphibious vehicle.

* * * * *